(12) United States Patent
Pinckney

(10) Patent No.: US 6,303,527 B1
(45) Date of Patent: Oct. 16, 2001

(54) TRANSPARENT GLASS-CERAMICS BASED ON ALPHA- AND BETA-WILLEMITE

(75) Inventor: Linda R. Pinckney, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/686,419

(22) Filed: Oct. 11, 2000

Related U.S. Application Data

(60) Provisional application No. 60/160,138, filed on Oct. 18, 1999, and provisional application No. 60/167,871, filed on Nov. 29, 1999.

(51) Int. Cl.[7] ............ C03C 10/04; C09K 11/08; C09K 11/59
(52) U.S. Cl. ............ 501/5; 252/301.4 R; 252/301.6 R; 65/33.1
(58) Field of Search ............ 501/5; 252/301.4 R, 252/301.6 R; 65/33.1

(56) References Cited

U.S. PATENT DOCUMENTS

| 4,714,687 | 12/1987 | Holleran et al. ............ 501/9 |
| 6,120,906 | 9/2000 | Terashi ............ 428/426 |

*Primary Examiner*—Karl Group
(74) *Attorney, Agent, or Firm*—Vincent T. Kung

(57) ABSTRACT

A glass-ceramic which is substantially and desirably totally transparent, and which contains a willemite predominant crystal phase within the ternary $Mg_2SiO_4$—$Zn_2SiO_4$—$Li_4SiO_4$ system. The glass-ceramic is formed from precursor glasses having the following compositions, in weight percent on an oxide basis, of 25–60 $SiO_2$, 4–20 $Al_2O_3$, 20–55 ZnO, 0–12 MgO, 0–18 $K_2O$, 0–12 $Na_2O$, 0–30 $GeO_2$, with the condition that $\Sigma K_2O+Na_2O \geq 5$. The glass-ceramic may be doped with up to 1 wt. % $Cr_2O_3$ to impart optical activity thereto.

12 Claims, No Drawings

TRANSPARENT GLASS-CERAMICS BASED ON ALPHA- AND BETA-WILLEMITE

CROSS-REFERENCE TO RELATED APPLICATIONS

An application entitled TRANSITION-METAL GLASS-CERAMIC GAIN MEDIA, filed as a U.S. Provisional Application Ser. No. 60/160,053, on Oct. 18, 1999, in the names of George H. Beall et al., and assigned to the same assignee as this application, is directed to transition-metal doped, glass ceramic materials that exhibit properties that make them suitable as gain media for use in optical amplifiers and/or laser pumps.

An application entitled TRANSPARENT (LITHIUM, ZINC, MAGNESIUM) ORTHOSILICATE GLASS-CERAMICS, filed as a U.S. Provisional Application Ser. No. 60/159,967, on Oct. 18, 1999, in the names of George H. Beall and Linda R. Pinckney, and assigned to the same assignee as this application, is directed to transition-metal-doped, glass-ceramic materials that exhibit properties that make them suitable as gain media in optical amplifiers and/or laser pumps.

An application entitled GLASS-CERAMIC FIBER AND METHOD, filed as U.S. Provisional Application Ser. No. 60/160,052 on Oct. 18, 1999 in the names of George H. Beall, Linda R. Pinckney, William Vockroth and Ji Wang and assigned to the same assignee as this application, is directed to glass-ceramic materials containing nanocrystals and being doped with a transition metal, and to a method of producing such glass-ceramics in the form of optical fibers.

An application entitled TRANSPARENT AND TRANSLUCENT FORSTERITE GLASS-CERAMICS, filed as a U.S. Provisional Application Ser. No. 60/160,093 filed on Oct. 18, 1999, by George H. Beall, and of U.S. Supplemental Provisional Application Ser. No. 60/174,012 having the same title and filed Dec. 30, 1999 by George H. Beall.

The present application claims the benefit of U.S. Provisional Application Ser. No. 60/160,138, entitled GLASS-CERAMICS BASED ON ALPHA- AND BETA-WILLEMITE, filed on Oct. 18, 1999, in the name of Linda R. Pinckney, and of U.S. Provisional Application Ser. No. 60/167,871 having the same title and filed Nov. 29, 1999 by Linda R. Pinckney.

FIELD OF INVENTION

The present invention relates to transparent glass ceramics, and in particular to substantially transparent glass-ceramics based on crystals of alpha- and beta-willemite.

BACKGROUND OF THE INVENTION

Glass-ceramics are polycrystalline materials formed by a controlled crystallization of a precursor glass. The method for producing such glass-ceramics customarily involves three fundamental steps: first, a glass-forming batch is melted; second, the melt is simultaneously cooled to a temperature at least below the transformation range thereof and a glass body of a desired geometry shaped therefrom; and third, the glass body is heated to a temperature above the transformation range of the glass in a controlled manner to generate crystals in situ.

Frequently, the glass body is exposed to a two-stage treatment. Hence, the glass will be heated initially to a temperature within, or somewhat above, the transformation range for a period of time sufficient to cause the development of nuclei in the glass. Thereafter, the temperature will be raised to levels approaching, or even exceeding, the softening point of the glass to cause the growth of crystals on the previously-formed nuclei. The resultant crystals are commonly more uniformly fine-grained, and the articles are typically more highly crystalline. Internal nucleation allows glass-ceramics to possess such favorable qualities as a very narrow particle size distribution and highly uniform dispersion throughout the glass host.

Transparent glass-ceramics are well known to the art; the classic study thereof being authored by G. H. Beall and D. A. Duke in "Transparent Glass-Ceramics", *Journal of Materials Science*, 4, pp. 340–352 (1969). Glass-ceramic bodies will display transparency to the human eye when the crystals present therein are considerably smaller than the wavelength of visible light. More specifically, transparency generally results from crystals less than 50 nm, and preferably as low as 10 nm in size.

Recently, much effort has been concentrated in the area of using transparent glass-ceramics as hosts for transition metals which act as optically active dopants. Suitable glass-ceramic hosts must be tailored such that transition elements will preferentially partition into the crystals. Co-pending application Ser. No. 60/160,053, entitled "Transition Metal Glass-Ceramics" by Beall et al. is co-assigned to the present assignee, and is herein incorporated by reference in its entirety It is directed to transition-metal doped glass-ceramics suitable for formation of a telecommunications gain or pump laser fiber.

Transparent glass-ceramics which contain relatively small numbers of crystals can be of great use in cases where the parent glass provides an easy-to-melt or an-easy-to-form vehicle for a crystal. The crystal, in itself, may be difficult or expensive to synthesize, but may provide highly desirable features, such as optical activity. The crystals in the glass-ceramic are generally oriented randomly throughout the bulk of the glass, unlike a single crystal which has a specific orientation. Random orientation, and consequent anisotropy, are advantageous for many applications, one example being that of optical amplifiers, where polarization-independent gain is imperative.

Transparent glass-ceramics doped with transition elements can combine the optical efficiency of crystals with the forming flexibility of glass. For example, both bulk (planar) and fiber forms can be fabricated from these glass-ceramics.

Therefore, there exists a need for transparent glass-ceramic materials which contain small tetrahedral and interstitial sites, and hence are suitable as potentially valuable hosts for small, optically active transition elements. Such elements include, but are not limited to, $Cr^{4+}$, $Cr^{3+}$, $Co^{3+}$, $Co^{2+}$, $Cu^{2+}$, $Mn^{2+}$, $Cu^{2+}$, and $Ni^{2+}$. These elements impart luminescence and fluorescence to such doped, glass-ceramic materials, thereby rendering them suitable for application in the optical field industry.

The crystal structures of both alpha- and beta-willemite (i.e., zinc orthosilicate ($Zn_2SiO_4$)) consist of frameworks of $SiO_4$ and $ZnO_4$ tetrahedra.

The alpha-willemite structure was determined in 1930. It is isostructural with phenacite ($Be_2SiO_4$), with rhombohedral space group R $\overline{3}$, and consists of linked $SiO_4$ and $ZnO_4$ tetrahedra. All $Zn^{2+}$ ions occur in tetrahedral coordination. Each oxygen atom is linked to one silicon and two zinc atoms.

The beta-willemite phase has a crystal structure related to those of the silica polymorphs tridymite and cristobalite. Half of the zinc ions are in tetrahedral coordination while the remaining half lie in interstitial positions. Phase equilibrium studies confirm that the alpha-willemite form is the sole thermodynamically stable binary compound in the ZnO—$SiO_2$ system. However, the metastable beta-willemite is obtained quite readily as a devitrification product in glasses. When held at temperatures above 850° C., beta-willemite ultimately transforms to the stable alpha polymorph.

The beta-willemite phase offers several potentially useful properties. Unlike alpha-willemite, beta-willemite can have a widely variable composition, ranging from 33 to 67 mole % ZnO. This wide range of solid solution allows the phase to be obtained in glass-ceramics of widely varying composition.

Glass-ceramics containing the alpha-willemite form of $Zn_2SiO_4$ are known, particularly as materials for electronic applications. U.S. Pat. No. 4,714,687 is directed to glass-ceramic materials containing willemite as a predominant crystal phase and especially designed for substrates in integrated circuit packaging. The glass-ceramic consists essentially, in terms of weight percent, of 30–55 $SiO_2$, 10–30 $Al_2O_3$, 15–45 ZnO, and 3–15 MgO.

However, what the prior art has failed to disclose, and what this invention teaches, is a willemite glass-ceramic material that is transparent and is suitable for employment in the fiber optic industry.

Accordingly, the primary object of the present invention is to provide glass-ceramic materials which are substantially and desirably totally transparent, and which contain a predominant willemite crystal phase.

Another object of the present invention is to provide such willemite glass-ceramics which are capable of being doped with ingredients that confer luminescence and/or fluorescence thereto.

An important advantage of the present glass-ceramic family is that it provides a material containing a willemite crystalline phase which can be tetrahedrally-coordinated with transition metal ions including, but not limited to, $Cr^{4+}$, $Cr^{3+}$, $Co^{3+}$, $Co^{2+}$, $Cu^{2+}$, $Mn^{2+}$, $Cu^{2+}$, and $Ni^{2+}$. Further, the glass-based thus providing the important flexibility of allowing for fabrication of both bulk (such as planar substrates) and fiber (such as optical fiber) forms.

Other objects and advantages of the present invention will be apparent from the following description.

BRIEF SUMMARY OF THE INVENTION

In accordance with the present invention there is provided a transparent glass-ceramic containing a predominant crystal phase of alpha- and/or beta-willemite and having a composition consisting essentially, in weight percent on an oxide basis, of 25–60 $SiO_2$, 4–20 $Al_2O_3$, 20–55 ZnO, 0–12 MgO, 0–18 $K_2O$, 0–12 $Na_2O$, 0–30 $GeO_2$, with the condition that $\Sigma K_2O+Na_2O \geq 5$.

To obtain the greatest transparency in the final glass-ceramic article, the most preferred composition will consist essentially, expressed in terms of weight percent on the oxide basis, of 35–50 $SiO_2$, 8–15 $Al_2O_3$, 30–42 ZnO, 0–5 MgO, 3–10 $K_2O$, 0–6 $Na_2O$, 0–5 $GeO_2$.

To obtain optical activity in the present inventive willemite glass-ceramic materials, i.e., fluorescence, over the communications transmission wavelength range of 1100 to 1700 nm, up to 1 wt. % $Cr_2O_3$ may be added to the parent glass.

A method of making is also provided comprising the steps of:
a.) melting a batch for a glass having a composition consisting essentially, in weight percent on an oxide basis, of 25–60 $SiO_2$, 4–20 $Al_2O_3$, 20–55 ZnO, 0–12 MgO, 0–18 $K_2O$, 0–12 $Na_2O$, 0–30 $GeO_2$, with the condition that $\Sigma K_2O+Na_2O \geq 5$;

b.) cooling the glass to a temperature at least below the transformation range of the glass;
c.) exposing the glass to a temperature between about 550–950° C. for a period of time sufficient to cause the generation of a glass-ceramic which is substantially transparent and which contains a predominant willemite crystal phase; and,
d.) cooling the glass-ceramic to room temperature.

DETAILED DESCRIPTION OF THE INVENTION

Figure 1:
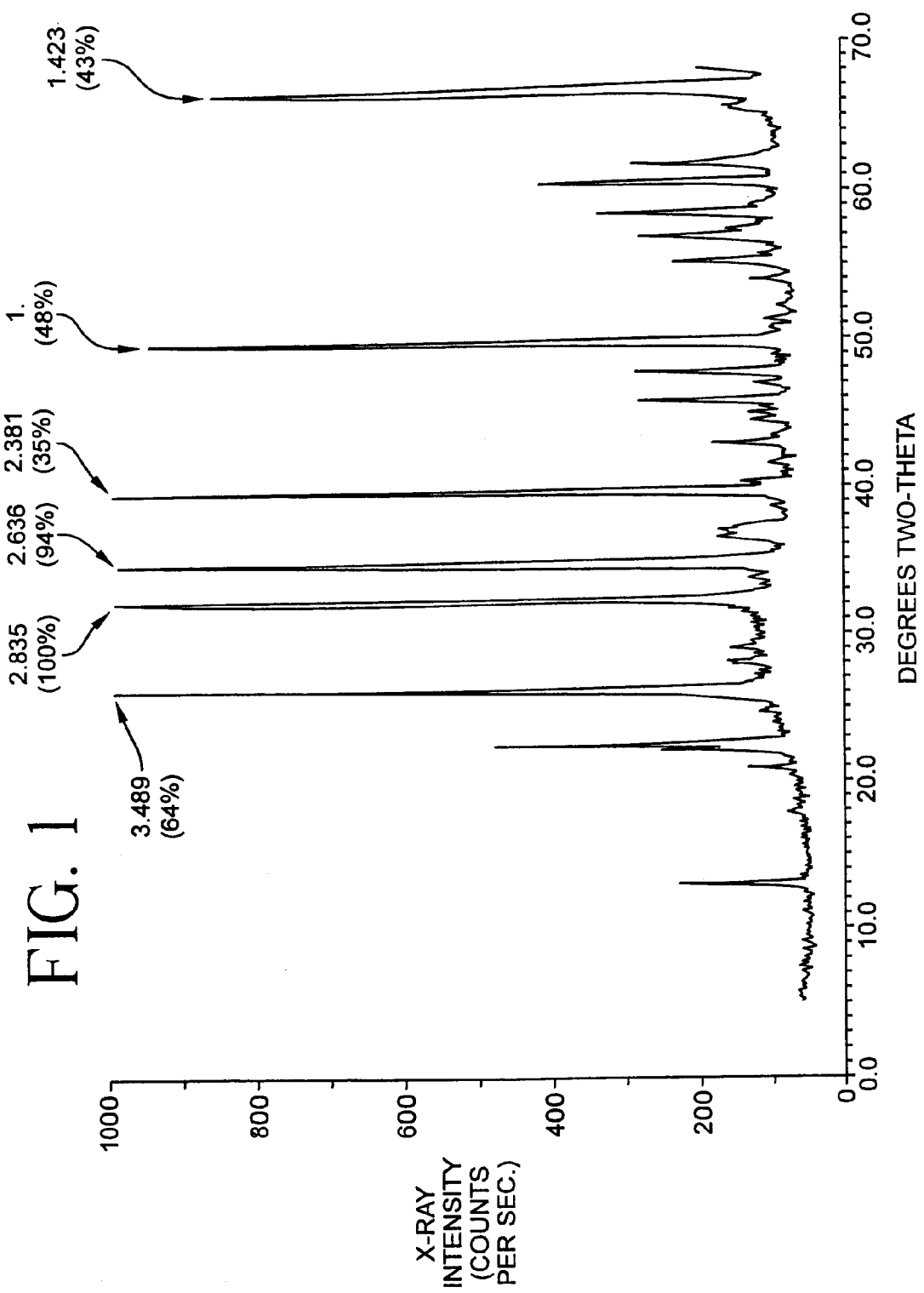
FIG. 1 is a powder X-ray diffraction spectra of a glass-ceramic that has the composition of Example 2, that has been produced by heat treating at 975° C. for 2 hours and that shows a predominant crystal phase of α-willemite.

The present inventive, substantially transparent, willemite glass-ceramics have compositions consisting essentially, in weight percent on an oxide basis, of

| | |
|---|---|
| $SiO_2$ | 25–60 |
| $Al_2O_3$ | 4–20 |
| ZnO | 20–55 |
| MgO | 0–12 |
| $K_2O$ | 0–18 |
| $Na_2O$ | 0–12 |
| $\Sigma K_2O + Na_2O$ | $\geq 5$ |
| $GeO_2$ | 0–30. |

To obtain the greatest degree of transparency in the final glass-ceramic article, the most preferred composition range consists essentially, in weight percent on an oxide basis, of

| | |
|---|---|
| $SiO_2$ | 35–50 |
| $Al_2O_3$ | 8–15 |
| ZnO | 30–42 |
| MgO | 0–5 |
| $K_2O$ | 3–10 |
| $Na_2O$ | 0–6 |
| $GeO_2$ | 0–5. |

The following Table sets forth a number of glass compositions, expressed in terms of parts by weight on the oxide basis, illustrating the parameters of the present invention. The Table also presents the ceramming schedule in ° C. and hours, as well as the crystal phases observed in the final glass-ceramics.

Inasmuch as the sum of the individual components in each recited glass approximates 100, for all practical purposes the tabulated values may be deemed to reflect weight percent. The batch ingredients for preparing glasses falling within the inventive composition ranges may comprise any materials, either the oxides or other compounds, which, upon being melted together, will be converted into the desired oxide in the proper proportions.

TABLE

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 39.1 | 41.5 | 40.5 | 40.5 | 41.5 | 41.5 | 41.5 | 40.6 | 41.7 | 42.4 | 38.7 | 28.0 | 40.0 | 40.7 | 42.7 | 44.7 |
| $Al_2O_3$ | 9.7 | 11.9 | 11.5 | 10.9 | 13.6 | 11.9 | 10.5 | 11.5 | 11.4 | 12.2 | 11.9 | 11.9 | 11.0 | 12.5 | 12.5 | 12.5 |
| ZnO | 43.8 | 36.5 | 36.0 | 36.5 | 34.3 | 36.5 | 36.5 | 36.5 | 40.2 | 36.5 | 35.2 | 30.5 | 40.0 | 30.0 | 26.0 | 22.0 |
| $K_2O$ | 4.3 | 8.7 | 12.0 | 8.7 | 8.6 | 8.7 | 8.5 | 8.5 | — | 3.8 | 8.6 | 8.6 | 8.0 | 11.8 | 11.8 | 11.8 |
| $Na_2O$ | 3.1 | 1.6 | — | 1.6 | 1.5 | 1.6 | 1.5 | 1.0 | 6.9 | 4.9 | 1.6 | 1.6 | — | — | — | — |
| $P_2O_5$ | — | — | — | 2.0 | — | — | — | — | — | — | — | — | — | — | — | — |
| $Li_2O$ | — | — | — | — | 0.5 | — | — | — | — | — | — | — | — | — | — | — |
| NaCl | — | — | — | — | — | 1.0 | — | — | — | — | — | — | — | — | — | — |
| BaO | — | — | — | — | — | — | 1.5 | — | — | — | — | — | — | — | — | — |
| CaO | — | — | — | — | — | — | — | 1.0 | — | — | — | — | — | — | — | — |
| $GeO_2$ | — | — | — | — | — | — | — | — | — | — | 4.0 | 19.5 | — | — | — | — |
| MgO | — | — | — | — | — | — | — | — | — | — | — | — | 1.0 | 5.0 | 7.0 | 9.0 |
| °C.-hr | 850-2 | 850-2 | 850-2 | 850-2 | 850-2 | 750-2 | 750-2 | 750-2 | 750-2 | 750-2 | 750-2 | 750-2 | 900-2 | 800-2 | 800-2 | 800-2 |
| Crystal Phase | beta | beta | beta | beta | beta + alpha | beta | beta | beta | beta | beta | beta + alpha | alpha | alpha | beta + alpha | beta + alpha | beta + alpha |

The exemplary glasses were produced in the following manner. The batch materials were compounded, mixed together to assist in securing a homogeneous melt, and then placed into platinum crucibles. The crucibles were introduced into a furnace operating at temperatures of 1400–1600° C., and the batches were melted for 4–16 hours. The melts were poured as free "patties"0 and transferred to an annealer operating at about 550–600° C.

The glass patties were subjected to the ceramming cycle by placing them into a furnace and heat treating according to the following schedule: 300° C./hour to a crystallization temperature T° C., hold at T° C. for 1–2 hours, and cool at furnace rate. The crystallization temperature T varied from 650–900° C., such that a substantially transparent, willemite glass-ceramic was obtained.

The inventive compositions are self-nucleating due to liquid-liquid phase separation and therefore require no added nucleating agents. More specifically, nucleation is promoted by amorphous phase separation. Even though nucleating agents are not required, in many cases the addition of nucleating agents, such as $TiO_2$ (4 wt. %), results in a finer crystal size and improved transparency: Care must be taken to avoid spontaneous crystallization in the annealer, however.

Up to 2% $Li_2O$, or up to 5% CaO, BaO, SrO, or $Ga_2O_3$, can be added. The addition of germania tends to stabilize the alpha-willemite polymorph over the beta-willemite polymorph.

The crystalline phases of the resulting glass-ceramic materials were identified using X-ray powder diffraction. Representative diffraction patterns are shown in FIG. 1 for a glass having the composition of Example 2 that has been heat treated at 975° C. for 2 hours, and in FIG. 2 for a glass having the composition of Example 2 that has been heat treated at 850° C. for 2 hours.

The structure of the inventive glass-ceramics contains microcrystals (10–50 nm in size) of alpha- and/or beta-willemite in a stable alkali aluminosilicate glass, with total crystallinity ranging from about 10% to 50% by volume depending on the individual composition. The microcrystals are internally grown in the base glass during the ceramming cycle. Transparency in the inventive glass ceramics is a function of microstructure which in turn is a function of the composition.

The crystal structure in the present inventive glass-ceramic material provides only small tetrahedral and interstitial sites. This feature renders the crystals potentially valuable hosts for small, optically active transition elements including, but not limited to, $Cr^{4+}$, $Cr^{3+}$, $Co^{3+}$, $Co^{2+}$, $Cu^{2+}$, $Mn^{2+}$, $Cu^{2+}$, and $Ni^{2+}$. These transition elements will fluoresce and luminesce at various wavelengths. While larger amounts of some of these elements may be incorporated in the precursor glasses, the amount employed in the present glasses will normally not exceed about 1% by weight.

As known in the optics and laser art, crystals with tetrahedrally-coordinated $Cr^{4+}$ ions provide unique optical characteristics. Therefore, in one possible application, the present inventive, transparent, willemite glass-ceramics, doped with transition metal ions, are suitable for employment in the optics and laser industries. Specific applications include, but are not limited to, optical amplifiers and pump lasers.

Figure 2:
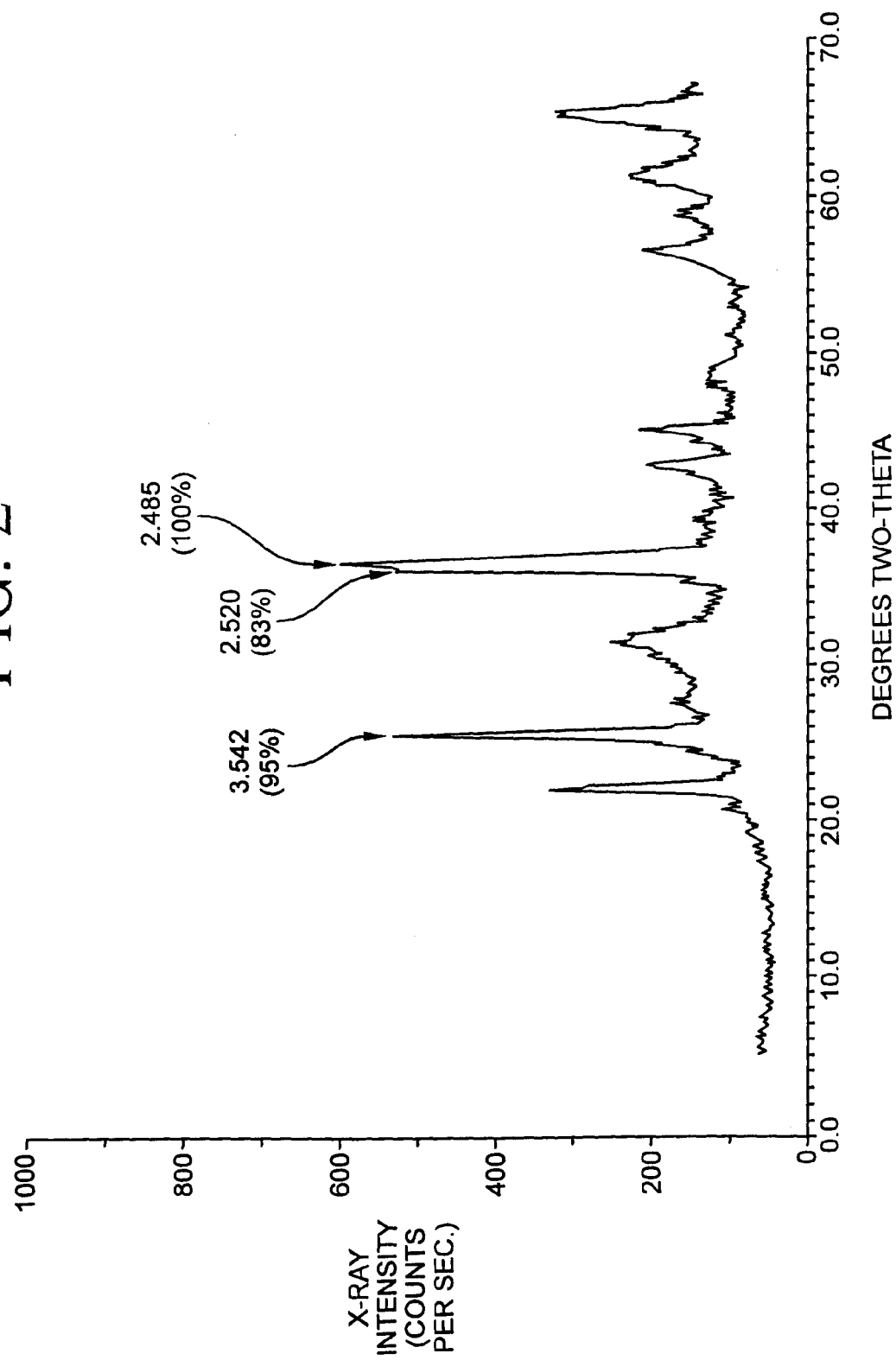
FIG. 2 is a powder X-ray diffraction spectra of a glass-ceramic that has the composition of Example 2, that has been produced by heat treating at 850° C. for 2 hours and that shows a predominant crystal phase of β-willemite.

In laboratory experiments, Examples 2 and 3 were doped with 0.08 wt. % chromium oxide and fluorescence measurements were taken. As shown in FIG. 2, strong $Cr^{4+}$ emission was observed, over the communications transmission wavelength range between 1100–1700 nm, in both glass-ceramics.

Although the present invention has been fully described by way of examples, it is to be noted that various changes and modifications will be apparent to those skilled in the art. Therefore, unless otherwise such changes and modifications depart from the scope of the present invention, they should be construed as included therein.

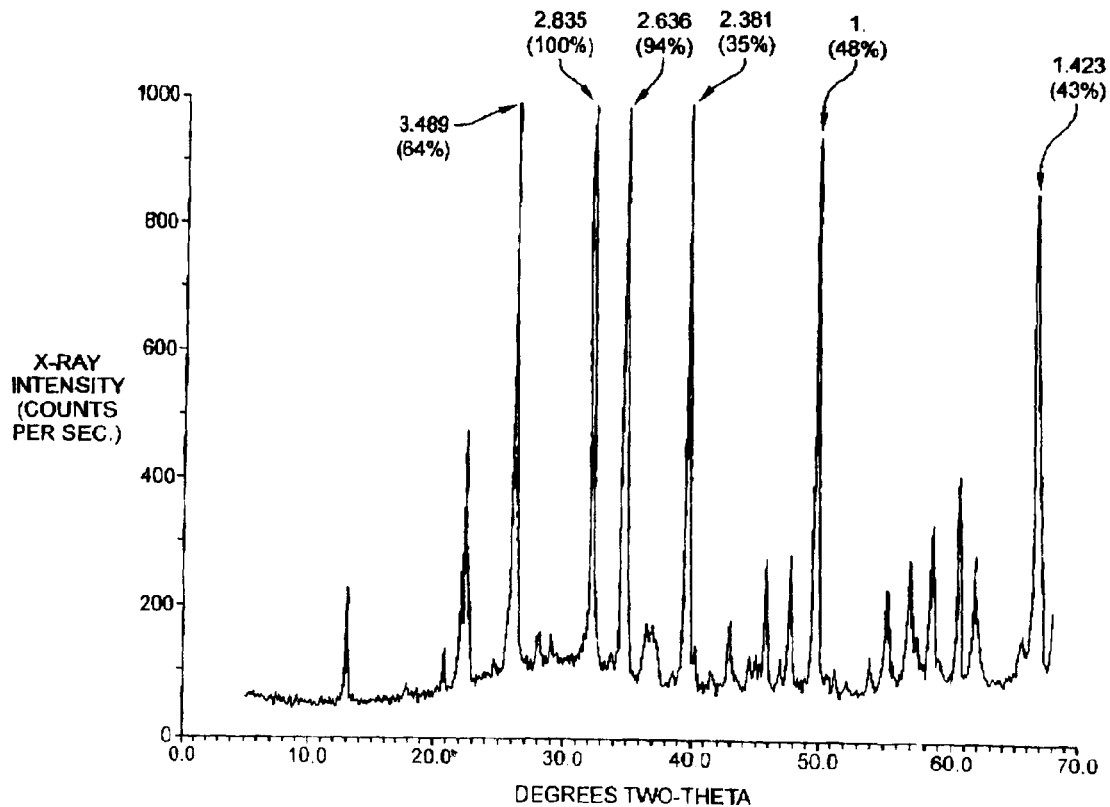

What is claimed is:

1. A substantially transparent glass-ceramic containing a willemite crystal phase as the predominant crystal phase, and having a composition consisting essentially, in weight percent on an oxide basis, of

| | |
|---|---|
| $SiO_2$ | 25–60 |
| $Al_2O_3$ | 4–20 |
| ZnO | 20–55 |
| MgO | 0–12 |
| $K_2O$ | 0–18 |
| $Na_2O$ | 0–12 |
| $\Sigma K_2O + Na_2O$ | $\geq 5$ |
| $GeO_2$ | 0–30. |

2. The glass-ceramic of claim 1 further including up to 2 wt. % $Li_2O$.

3. The glass-ceramic of claim 1 further including up to 5% of at least one oxide selected from the group consisting of CaO, BaO, SrO, and $Ga_2O_3$.

4. The glass-ceramic of claim 1 wherein said glass-ceramic can be tetrahedrally coordinated with transition metal ions selected from the group consisting of $Cr^{4+}$, $Cr^{3+}$, $Co^{3+}$, $Co^{2+}$, $Cu^{2+}$, $Mn^{2+}$, $Cu^{2+}$, and $Ni^{2+}$, to provide optical activity.

5. The glass-ceramic of claim 4 wherein said glass-ceramic contains up to 1 wt. % $Cr_2O_3$.

6. A substantially transparent glass-ceramic containing a willemite crystal phase as the predominant crystal phase, and having a composition which consists essentially, in weight percent on an oxide basis, of

| | |
|---|---|
| $SiO_2$ | 35–50 |
| $Al_2O_3$ | 8–15 |
| ZnO | 30–42 |
| MgO | 0–5 |
| $K_2O$ | 3–10 |
| $Na_2O$ | 0–6 |
| $GeO_2$ | 0–5. |

7. The glass-ceramic of claim 6 wherein said glass-ceramic can be tetrahedrally coordinated with transition metal ions selected from the group consisting of $Cr^{4+}$, $Cr^{3+}$, $Co^{3+}$, $Co^{2+}$, $Cu^{2+}$, $Mn^{2+}$, $Cu^{2+}$, and $Ni^{2+}$, to provide optical activity.

8. The glass-ceramic claim 7 wherein said glass-ceramic contains up to 1 wt. % $Cr_2O_3$.

9. The glass-ceramic of claim 1 wherein said willemite crystals are 10–50 nm in size, such that said glass-ceramic is substantially transparent.

10. The glass-ceramic of claim 1 wherein said glass-ceramic has a total crystallinity from about 10% to 50%, such that said glass-ceramic is substantially transparent.

11. A method of making a transparent glass-ceramic based on alpha- and beta-willemite crystals comprising the steps of:
   a.) melting a batch for a glass having a composition consisting essentially, in weight percent on an oxide basis, of 25–60 $SiO_2$, 4–20 $Al_2O_3$, 20–55 ZnO, 0–12 MgO, 0–18 $K_2O$, 0–12 $Na_2O$, 0–30 $GeO_2$, with the condition that $\Sigma K_2O + Na_2O \geq 5$;
   b.) cooling the glass to a temperature at least below the transformation range of the glass;
   c.) exposing the glass to a temperature between about 550–950° C. for a period of time sufficient to generate a glass-ceramic which is substantially transparent and which contains a predominant willemite crystal phase; and,
   d.) cooling the glass-ceramic to room temperature.

12. The method of claim 11 wherein said glass also contains up to 1 wt. % $Cr_2O_3$, the amount being such that said glass-ceramic demonstrates optical activity.

* * * * *

UNITED STATES PATENT AND TRADEMARK OFFICE
CERTIFICATE OF CORRECTION

| | | |
|---|---|---|
| PATENT NO. | : 6,303,527 B1 | Page 1 of 5 |
| APPLICATION NO. | : 09/686419 | |
| DATED | : October 16, 2001 | |
| INVENTOR(S) | : Pinckney | |

It is certified that error appears in the above-identified patent and that said Letters Patent is hereby corrected as shown below:

The title page showing an illustrative figure should be deleted and substitute therefore the attached title page.

Figure 3:
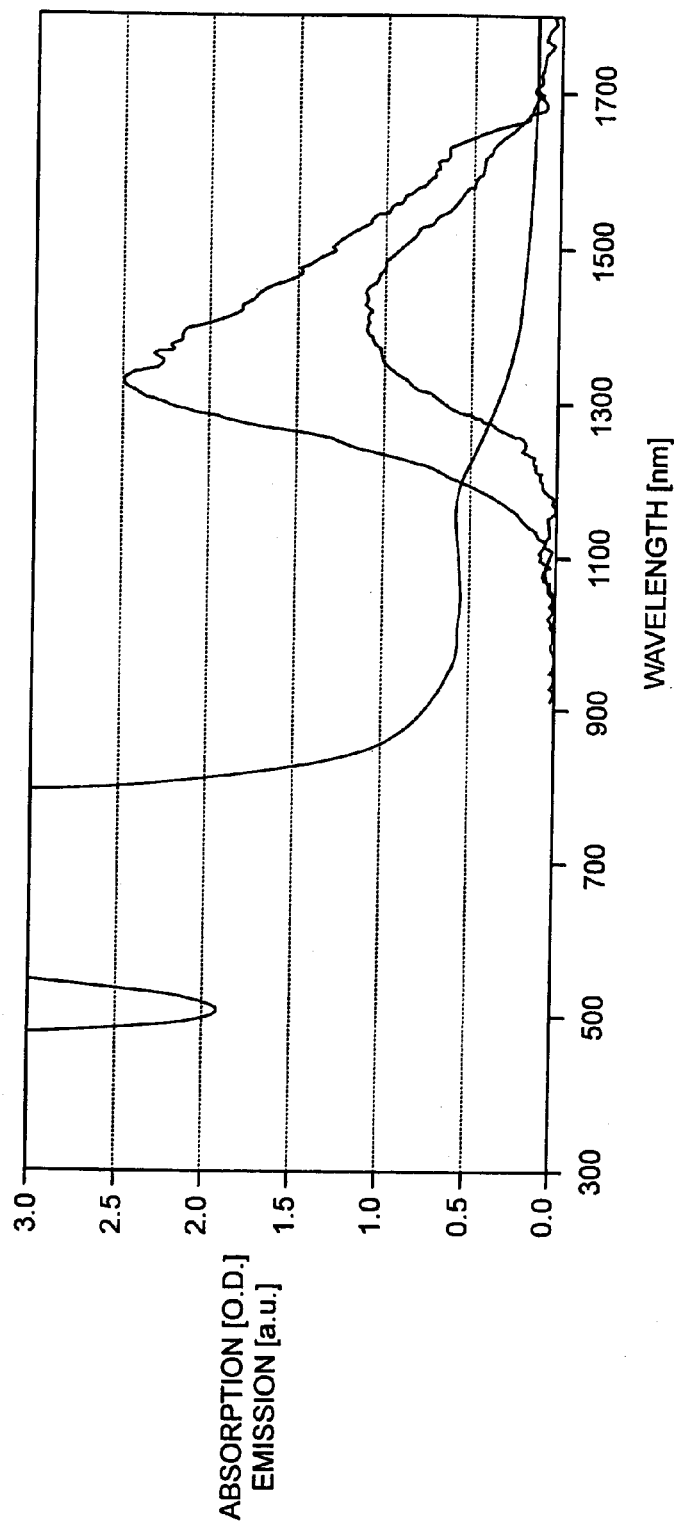
FIG. 3 shows the fluorescence spectra for the glass-ceramics of Examples 2 and 13 when doped with 0.08 wt. % $Cr_2O_3$.

Please add the Drawing Sheets consisting of Fig 1-3 as shown on the attached pages.

Signed and Sealed this

Nineteenth Day of September, 2006

JON W. DUDAS
*Director of the United States Patent and Trademark Office*

United States Patent
Pinckney

(10) Patent No.: US 6,303,527 B1
(45) Date of Patent: Oct. 16, 2001

(54) TRANSPARENT GLASS-CERAMICS BASED ON ALPHA- AND BETA-WILLEMITE

(75) Inventor: Linda R. Pinckney, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/686,419

(22) Filed: Oct. 11, 2000

Related U.S. Application Data

(60) Provisional application No. 60/160,138, filed on Oct. 18, 1999, and provisional application No. 60/167,871, filed on Nov. 29, 1999.

(51) Int. Cl.[7] .............................. C03C 10/04; C09K 11/08; C09K 11/59
(52) U.S. Cl. .............. 501/5; 252/301.4 R; 252/301.6 R; 65/33.1
(58) Field of Search .................. 501/5; 252/301.4 R, 252/301.6 R; 65/33.1

(56) References Cited

U.S. PATENT DOCUMENTS

| | | | |
|---|---|---|---|
| 4,714,687 | 12/1987 | Holleran et al. | 501/9 |
| 6,120,906 | 9/2000 | Terashi | 428/426 |

Primary Examiner—Karl Group
(74) Attorney, Agent, or Firm—Vincent T. Kung

(57) ABSTRACT

A glass-ceramic which is substantially and desirably totally transparent, and which contains a willemite predominant crystal phase within the ternary $Mg_2SiO_4$—$Zn_2SiO_4$—$Li_4SiO_4$ system. The glass-ceramic is formed from precursor glasses having the following compositions, in weight percent on an oxide basis, of 25–60 $SiO_2$, 4–20 $Al_2O_3$, 20–55 ZnO, 0–12 MgO, 0–18 $K_2O$, 0–12 $Na_2O$, 0–30 $GeO_2$, with the condition that $\Sigma K_2O + Na_2O \geq 5$. The glass-ceramic may be doped with up to 1 wt. % $Cr_2O_3$ to impart optical activity thereto.

12 Claims, 3 Drawing Sheets